United States Patent
Forghieri et al.

(10) Patent No.: US 8,275,257 B2
(45) Date of Patent: Sep. 25, 2012

(54) DIFFERENTIAL QUADRATURE PHASE-SHIFT KEYING TRANSMISSION SYSTEM WITH VARIABLE TRANSMISSION RATE

(75) Inventors: Fabrizio Forghieri, Modena (IT); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 1255 days.

(21) Appl. No.: 11/736,192

(22) Filed: Apr. 17, 2007

(65) Prior Publication Data

US 2008/0259968 A1    Oct. 23, 2008

(51) Int. Cl.
*H04B 10/08* (2006.01)

(52) U.S. Cl. ............................................ 398/25; 398/34

(58) Field of Classification Search .................. 370/465, 370/468, 535, 536, 432; 398/41–48, 25, 398/188, 79, 26; 714/704; 359/179
See application file for complete search history.

(56) References Cited

U.S. PATENT DOCUMENTS

| | | | |
|---|---|---|---|
| 5,491,565 A | 2/1996 | Naper | |
| 6,690,884 B1 | 2/2004 | Kelty et al. | |
| 7,023,256 B2 | 4/2006 | Konczykowska et al. | |
| 7,483,389 B2 * | 1/2009 | Tong et al. | 370/253 |
| 7,593,418 B1 * | 9/2009 | Benhaim et al. | 370/432 |
| 2003/0002117 A1 * | 1/2003 | Naik et al. | 359/179 |
| 2004/0146297 A1 * | 7/2004 | Agarwal et al. | 398/25 |
| 2004/0184819 A1 * | 9/2004 | Vassilieva et al. | 398/188 |
| 2004/0243888 A1 * | 12/2004 | Ngo | 714/704 |
| 2005/0135731 A1 | 6/2005 | Welch et al. | |
| 2005/0191054 A1 * | 9/2005 | Aoki et al. | 398/45 |
| 2008/0170861 A1 * | 7/2008 | Vassilieva et al. | 398/147 |
| 2009/0129775 A1 * | 5/2009 | Handelman | 398/47 |
| 2009/0214212 A1 * | 8/2009 | Vorbeck et al. | 398/79 |
| 2011/0091206 A1 * | 4/2011 | He et al. | 398/26 |

FOREIGN PATENT DOCUMENTS

EP    1 193 887 A1    4/2002

OTHER PUBLICATIONS

Jansen, S., van den Bornem D., Krummrich, P., Spatter, S., Khoe, G., and de Waardt, H. 'Long-Haul DWDMTransmission Systems Employing Optical Phase Conjugation', IEEE Journal of Selected topics in Quantum Electronics, Vol. 12, No. 4 [online], Jul./Aug. 2006, abstract and last paragraph of Section III.

* cited by examiner

*Primary Examiner* — Andrew Lai
*Assistant Examiner* — Syed M Bokhari
(74) *Attorney, Agent, or Firm* — P. Su

(57) ABSTRACT

Methods and apparatus for varying the transmission rate of a signal transmitted within a dense wavelength division multiplexing (DWDM) system or network are disclosed. According to one aspect of the present invention, a method includes obtaining a first signal and determining a transmission rate associated with the first. If it is determined that the transmission rate is a first rate, the method includes processing the first signal as having a first transmission format and the first rate. Alternatively, it is determined that the transmission rate is not the first rate and is a second rate, the method includes processing the first signal as having a second transmission format and a second rate.

23 Claims, 6 Drawing Sheets

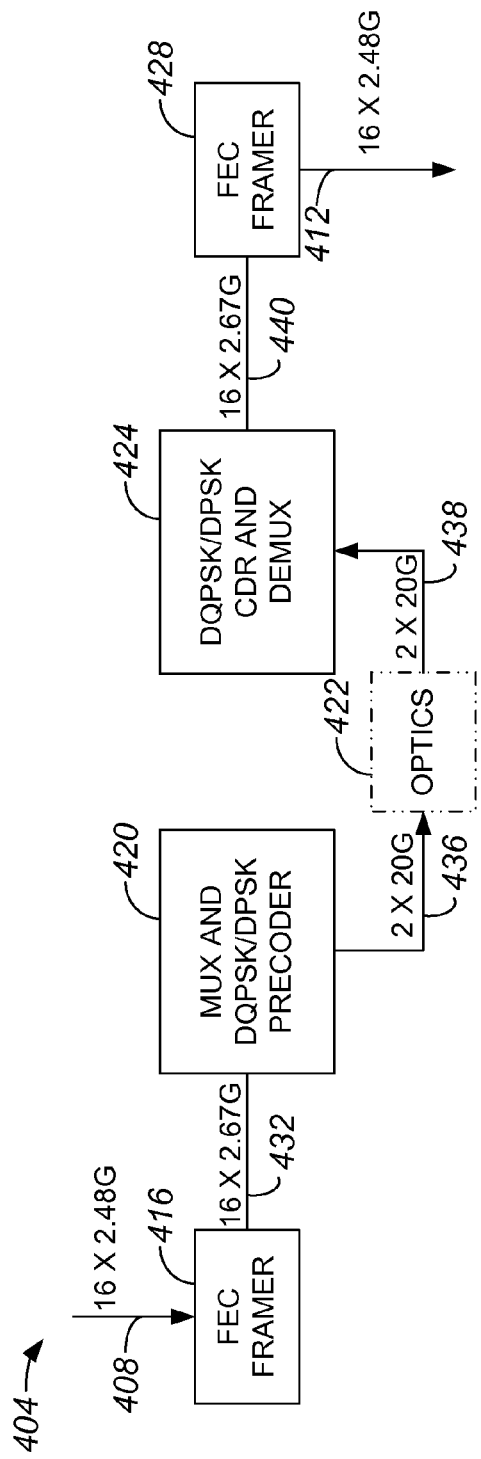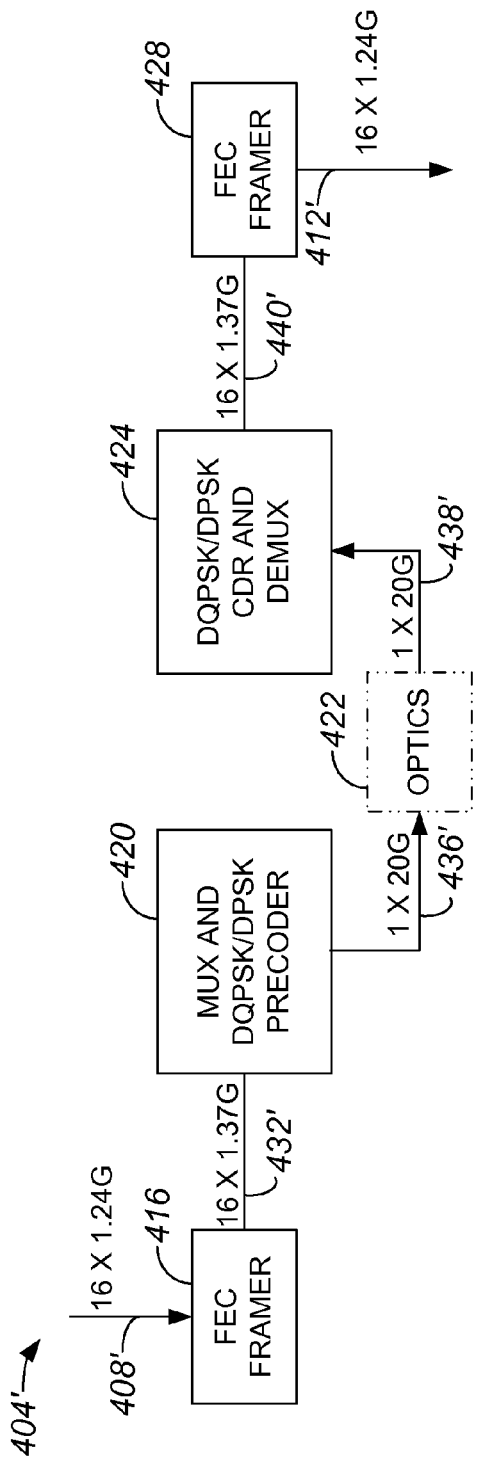

DIFFERENTIAL QUADRATURE PHASE-SHIFT KEYING TRANSMISSION SYSTEM WITH VARIABLE TRANSMISSION RATE

BACKGROUND OF THE INVENTION

The present invention relates generally to systems and networks which support dense wavelength division multiplexing (DWDM).

Data transmission at relatively high bit rates is generally desirable in a system or a network that supports DWDM. However, relatively high bit rates are not always achievable, particularly when the distance over which data is to be transmitted is relatively long. For example, the optical signal-to-noise ratio (OSNR) associated with data transmission may become inadequate as the distance over which data is transmitted increases. Hence, if a distance is relatively long, the transmission rate of the data may be reduced to effectively reduce the required OSNR.

BRIEF DESCRIPTION OF THE DRAWINGS

The invention may best be understood by reference to the following description taken in conjunction with the accompanying drawings in which:

FIG. 4A is a block diagram representation of a transponder arrangement which processes a 40 Gbps DQPSK transmission format in accordance with an embodiment of the present invention.

FIG. 4B is a block diagram representation of a transponder arrangement, e.g., transponder arrangement 404 of FIG. 4A, which processes a 20 Gbps DPSK transmission format in accordance with an embodiment of the present invention.

DESCRIPTION OF THE EXAMPLE EMBODIMENTS

General Overview

In one embodiment, a method includes receiving a first signal which is of a first transmission rate associated with a dense wavelength division multiplexing (DWDM) environment. According to one aspect of the present invention, a method includes obtaining a first signal and determining a transmission rate associated with the first signal. If it is determined that the transmission rate is a first rate, the method includes processing the first signal as having a first transmission format and the first rate. Alternatively, it is determined that the transmission rate is not the first rate and is a second rate, the method includes processing the first signal as having a second transmission format and a second rate.

Description

A switchable transmission rate system allows transmission rates to be adapted to accommodate optical signal-to-noise ratios (OSNRs) within a dense wavelength division multiplexing (DWDM) environment. Phase-shift keying is a digital modulation scheme that alters the phase of a reference signal or a carrier wave to enable data to be transmitted within the DWDM environment. Phase-shift keying methods include differential phase-shift keying (DPSK) and differential quadrature phase-shift keying (DQPSK). In one embodiment, switching transmission rates includes switching a modulation format of the signal from a DQPSK transmission format to a DPSK transmission format. When the bit rate of a signal is changed, the transmission format is also changed.

A system may use a higher bit rate with DQPSK transmission format when the OSNR of a signal allows, and switch to using a lower bit rate with DPSK transmission format when the OSNR of the signal in the higher bit rate is inadequate. The system is arranged to allow a signal of a DQPSK transmission format to pass through in the DQPSK transmission format if the OSNR is acceptable, and also to allow a signal of a DPSK transmission format to pass through in the DPSK transmission format. As the transmission rate changes, the transmission format changes accordingly between a DQPSK transmission format and a DPSK transmission format.

By way of example, if a signal has a transmission rate of approximately 40 Gigabits per second (Gbps) but the OSNR is not sufficient to guarantee a desired level of performance, the signal may be switched to a transmission rate of approximately 20 Gbps to achieve an improved OSNR for the signal. For links in which the associated OSNR does not allow for DQPSK transmissions at approximately 40 Gbps, a switch may be made to a 20 Gbps DPSK transmission format. Such a switch enables substantially the same target performance, e.g., a target in which a pre-forward error correction bit error correction rate (pre-FEC BER) is approximately 1E-4, to be achieved. In addition, such a switch allows the reach of a signal to be increased, as for example approximately doubled, if the transmission rate is reduced.

Figure 1A:
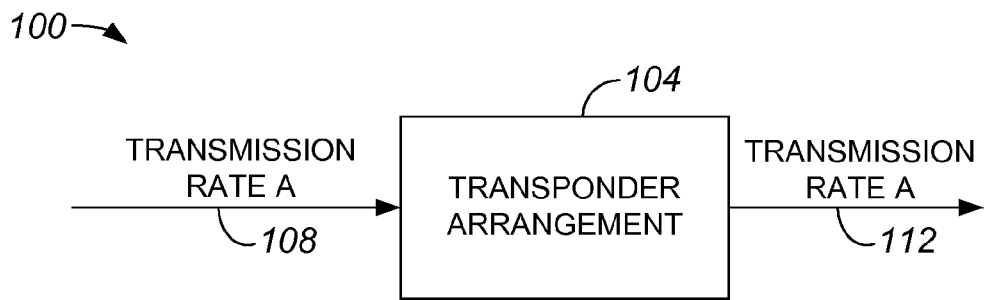
FIG. 1A is a block diagram representation of a system in which a transponder arrangement processes signals of different transmission rates in accordance with an embodiment of the present invention.

In general, a switchable transmission rate system includes a transponder arrangement. FIG. 1A is a block diagram representation of a switchable transmission rate system in accordance with an embodiment of the present invention. A switchable transmission rate system 100 includes a transponder arrangement 104. Transponder arrangement 104, which may include hardware logic devices and/or software logic devices that are embodied on tangible media, receives as input a signal at a first transmission rate 108. First transmission rate 108 may be a transmission rate that is appropriate for desired purposes, transponder arrangement 104 effectively processes a signal of first transmission rate 108 and allows a first transmission rate 112 to be outputted. It should be appreciated that transponder arrangement 104 may be arranged to support a plurality of different transmission rates.

Figure 1B:
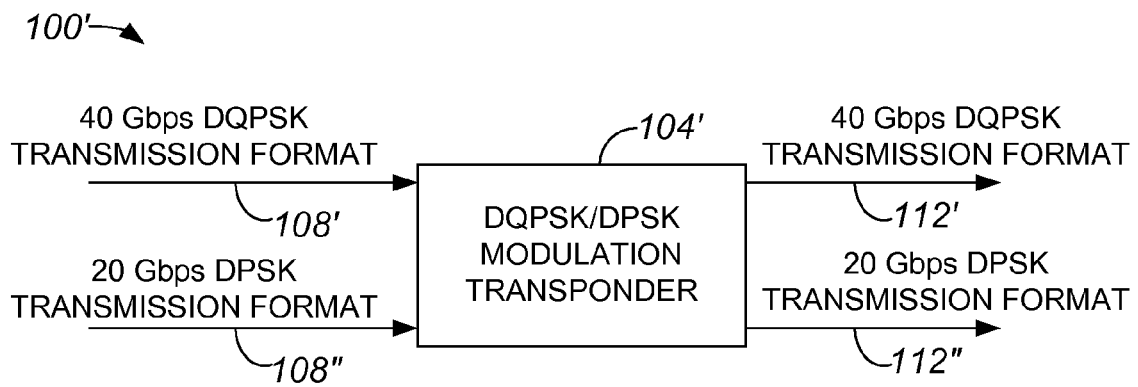
FIG. 1B is a block diagram representation of a system in which a transponder may process both a forty Gigabit per second (Gbps) differential quadrature phase-shift keying (DQPSK) transmission format and a twenty Gbps differential phase-shift keying (DPSK) transmission format in accordance with an embodiment of the present invention.

Transponder arrangement 104 may be arranged to process both an approximately 40 Gbps transmission rate and an approximately 20 Gbps transmission rate, although the transmission rates supported by transponder arrangement 104 may vary widely. With reference to FIG. 1B, a transponder arrangement that is arranged to process both an approximately 40 Gbps transmission rate and an approximately 20 Gbps transmission rate will be described in accordance with an embodiment of the present invention. Within a switchable transmission rate system 100', a modulation transponder 104' that is capable of processing a signal of an approximately 40 Gbps format 108' as well as a signal of an approximately 20 Gbps format 108" also processes signals of a DQPSK transmission format and a DPSK transmission format. That is, modulation transponder 104' is capable of processing a signal of an approximately 40 Gbps DQPSK transmission format 108' as well as a signal of an approximately 20 Gbps DPSK transmission format 108".

Modulation transponder 104' is also arranged to enable the signal of an approximately 40 Gbps DQPSK transmission format 108' to be processed and outputted as a signal of an approximately 40 Gbps DQPSK transmission format 112'. Additionally, modulation transponder 104' is further be arranged to enable the signal of an approximately 20 Gbps DPSK transmission format 108" to be processed and outputted as a signal of an approximately 20 Gbps DPSK transmission format 112". A determination of which signal format to provide to modulation transponder 104' may be based on whether the OSNR associated with system 100' is adequate to support the 40 Gbps DQPSK transmission format.

Figure 2:
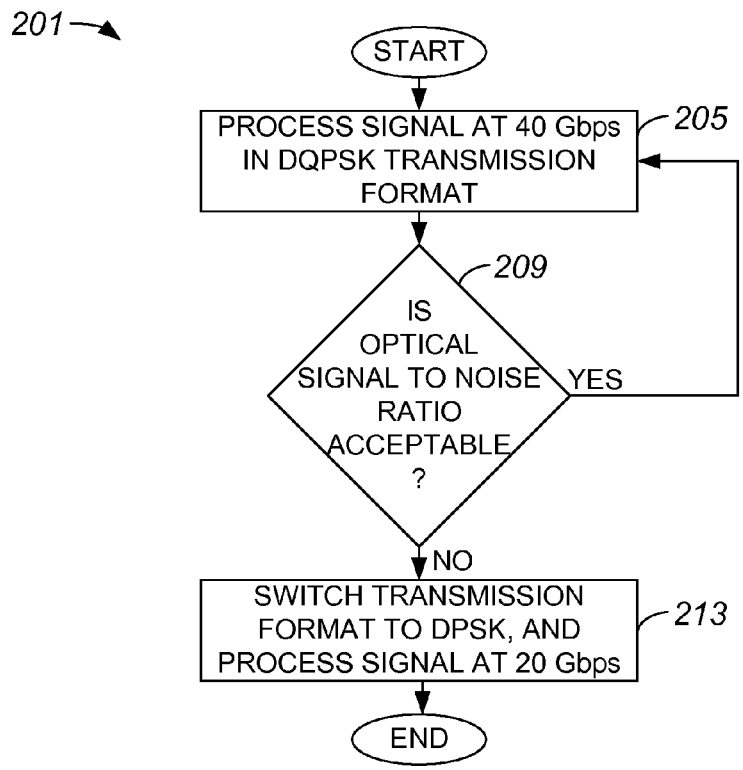
FIG. 2 is a process flow diagram which illustrates one process of using a system in which a transponder may switch a modulation format from a DQPSK transmission format to a DPSK transmission format in accordance with an embodiment of the present invention.

Referring next to FIG. 2, a method of processing a signal based on a determination of whether to utilize a transmission format based on the OSNR of an overall system will be described in accordance with an embodiment of the present invention. A method 201 of processing a signal begins at step 205 in which a signal is processed as a signal of an approximately 40 Gbps in a DQPSK transmission format. Once the signal is transmitted, e.g., to an endpoint within a system of a DWDM network, a determination is made in step 209 as to whether the OSNR associated with the system is acceptable.

If it is determined in step 209 that the OSNR is acceptable, the indication is that the OSNR is suitable for allowing the signal to be transmitted at approximately 40 Gbps. As such, process flow returns to step 205 in which the signal is transmitted at approximately 40 Gbps. Alternatively, if the determination in step 209 is that the OSNR is not acceptable, then the implication is that the OSNR is not enough to meet a desired performance level if the signal is transmitted at approximately 40 Gbps. Accordingly, in step 213, the transmission format is switched or otherwise transformed from a DQPSK transmission format to a DPSK transmission format such that the transponder arrangement processes a signal of an approximately 20 Gbps transmission format. After the approximately 20 Gbps signal is processed, the method of processing a signal is completed.

Figure 3:
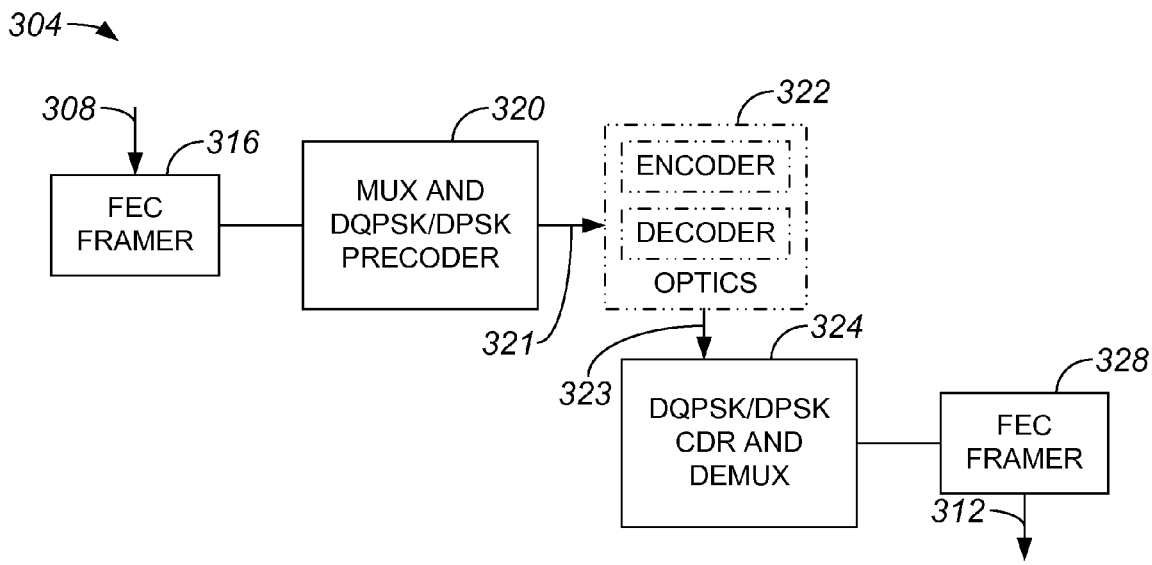
FIG. 3 is a block diagram representation of a transponder arrangement in accordance with an embodiment of the present invention.

A transponder arrangement that supports a plurality of transmission formats for a signal may include several elements or components. FIG. 3 is a block diagram representation of a transponder arrangement in accordance with an embodiment of the present invention. A transponder arrangement 304 includes FEC framers 316, 328. FEC framer 316, which may be an encoder, applies an error correction stream such as FEC bits to an input signal 308. In other words, FEC framer 316 may add bits to input signal 308 that may later be used for error correction. FEC framer 328, on the other hand, may be a decoder which decodes an FEC code, performs error correction, and creates an output signal 312.

Transponder arrangement 304 also includes a multiplexer (MUX) and DQPSK/DPSK precoder 320, as well as a DQPSK/DPSK clock and data recovery (CDR) and demultiplexer (DEMUX) 324. MUX and DQPSK/DPSK precoder 320 substantially precodes input information bits, e.g., information bits received from FEC framer 316, into modulation symbols associated with DQPSK or DPSK signal mapping, as appropriate, and provides precoded information 321 to an optical arrangement 322 that encodes and decodes the information 321 to generate information 323. In general, optical arrangement 322 may include an encoder, a decoder, and fiber which allows signals to be transmitted. That is, optical arrangement 322 may be an overall optical network.

DQPSK/DPSK CDR and DEMUX 324 effectively serves as a decoder that decodes modulation symbols provided by MUX and DQPSK/DPSK precoder 320 via optical arrangement 322. In one embodiment, DQPSK/DPSK CDR and DEMUX 324 effectively uses a DPSK signal mapping to decode the modulation symbols.

In one embodiment, transponder arrangement 304 may include transmission components, e.g., FEC framer 316 and MUX and DQPSK/DPSK precoder 320, of one transponder, as well as receiving components, e.g., DQPSK/DPSK CDR and DEMUX 324 and FEC framer 328, of a different transponder. In other words, transponder arrangement 304 may include components of a transmitting transponder and a receiving transponder.

With reference to FIGS. 4A and 4B, the processing of input signals provided to a transponder arrangement will be described with respect to the bit rate of the input signals, and whether the input signals are to be modulated in accordance with an embodiment of the present invention. FIG. 4A is a block diagram representation of a transponder arrangement with input and output signals that are approximately 40 Gigabit/s (Gb/s) in accordance with an embodiment of the present invention. A transponder arrangement 404 includes FEC framer 408, MUX and DQPSK/DPSK precoder 420, DQPSK/DPSK CDR and DEMUX 424, and FEC framer 428. FEC framer 408 and MUX and DQPSK/DPSK precoder 420 are a transmitter of transponder arrangement 404 that transmits information over an optics arrangement 422, e.g., an optics arrangement 422 that includes an encoder and a decoder, to a receiver of transponder arrangement 404 that includes DQPSK/DPSK CDR and DEMUX 424, and FEC framer 428.

An overall input signal 408 is approximately sixteen 2.48 G signals of binary bits. FEC framer 416 receives input signal 408 and generates an overall signal 432 which includes approximately sixteen 2.67 G signals. Overall signal 432 includes FEC bits added by FEC framer 416.

Generally, FEC framer 416 may operate at 40 G to accommodate overall input signal 432. However, it should be appreciated that FEC framer 416 may be variable in that FEC framer 416 may also operate to accommodate a 20 G input signal, e.g., FEC framer may also be arranged to operate at 20 G when appropriate.

In the embodiment as shown, an overall output signal 412 includes approximately sixteen 2.48 G signals. Hence, transponder arrangement 404 is arranged to process an approximately 40 Gbps DQPSK transmission format, as for example because the OSNR is adequate or acceptable for such a transmission format. As such, MUX and DQPSK/DPSK encoder 420 obtains signal 432 as an input, and creates an overall signal 436 that includes two approximately 20 G signals. Components of MUX and DQPSK/DPSK precoder 420 will be discussed below with reference to FIG. 5A. Signal 436 is provided to optics arrangement 422 which generates an overall signal 436 that includes two approximately 20 G signals. Optics arrangement 422 may encode signal 436, transmit the encoded signal, decode the transmitted signal, and provide the decoded signal 438 to DQPSK/DPSK CDR and DEMUX 424.

Signal 438 is obtained by DQPSK/DPSK CDR and DEMUX 424, which creates an overall signal 440 of approximately sixteen 2.67 G signals. DQPSK/DPSK CDR and DEMUX 424 will be described below with respect to FIG. 5B. Using signal 440, FEC framer 428 may perform error correction, and generate output signal 412.

Transponder arrangement 404 is arranged to accept signals other than approximately 40 G signals. Other signals that may be processed by transponder 404 include, but are not limited to, approximately 20 G signals. As previously mentioned, a transponder arrangement may generally process a 40 G signal of a DQPSK transmission format or an approximately 20 G signal of a DPSK transmission format, e.g., when an OSNR is not adequate for the approximately 40 G signal. With reference to FIG. 4B, the processing of an approximately 20 G signal will be described in accordance with an embodiment of the present invention. A transponder arrangement 404' receives an overall input signal 408' that includes approximately sixteen 1.24 G signals. FEC framer 416 obtains input signal 408', and outputs an overall signal 432' that includes approximately sixteen 1.37 G signals. Overall signal 432' includes FEC bits that may subsequently be used for error correction purposes. It should be appreciated that in lieu of overall signal 432' including approximately sixteen 1.37 G signals, FEC framer 416 may instead operate to create overall signal 432' to include approximately eight 2.48 G signals.

MUX and DQPSK/DPSK precoder 420 obtains signal 432' and generates an approximately 20 G signal 436', which is provided to an optics arrangement 422 that provides an approximately 20 G signal 438'. Signal 438' is used by DQPSK/DPSK CDR and DEMUX 424 to generate an overall signal 440' that includes approximately sixteen 1.37 G signals. FEC framer 428 performs error correction on signal 440', and generates an overall output signal 412' that includes approximately sixteen 1.24 G signals.

Figure 5A:
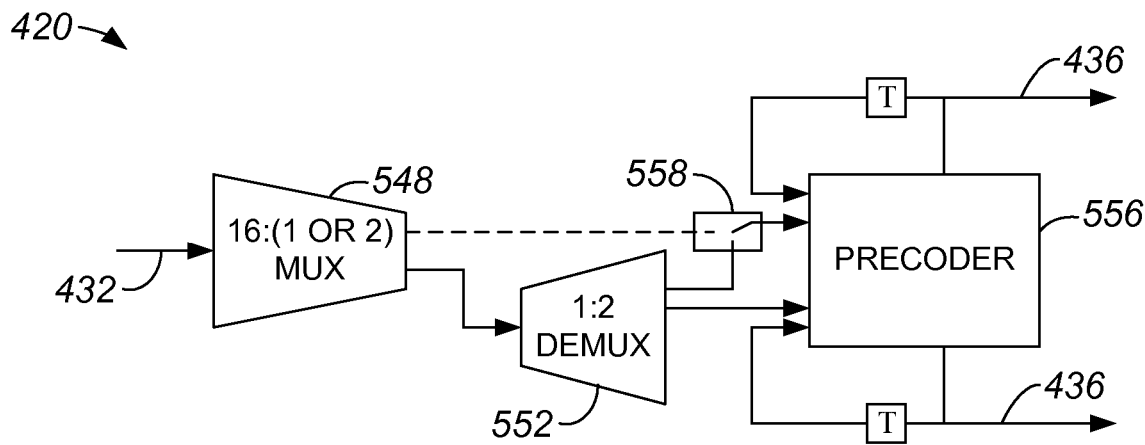
FIG. 5A is a diagrammatic representation of a multiplexer and encoder arrangement, e.g., multiplexer and precoder arrangement 420 of FIGS. 4A and 4B, in accordance with an embodiment of the present invention.

FIG. 5A is a diagrammatic representation of a MUX and DQPSK/DPSK precoder, e.g., MUX and DQPSK/DPSK precoder 420 of FIGS. 4A and 4B, in accordance with an embodiment of the present invention. MUX and DQPSK/DPSK precoder 420 includes a MUX 548, a DEMUX 552, a switch 558, and a precoder 556. MUX 548, which operates as a 16:1 MUX when overall input signal 432 is approximately 20 G and as a 16:2 MUX when overall input signal 432 is approximately 40 G. Precoder 556 is arranged to act as a DQPSK precoder and that utilizes two inputs and two outputs if an overall 40 G signal is being processed, or as a DPSK precoder that utilizes one input and one output if an overall 20 G signal is being processed. The approximately sixteen component signals in overall input signal 432 are multiplexed such that either one or two, as appropriate, signals pass out of MUX 548 at a time.

DEMUX 552 demultiplexes an input obtained from MUX 548, and creates two signals that are provided to precoder 556. DEMUX 552 provides functionality that allows MUX and DQPSK/DPSK precoder 420 to encode both DQPSK and DPSK transmission formats. Precoder 556 may be a recursive precoder, and effectively generates overall signal 436 by coding an input data stream into a differential format. It should be appreciated that overall signal 436 may include a single approximately 20 G signal when overall input signal 432 is approximately 20 G, and include two approximately 20 G signals when overall input signal 432 is approximately 40 G.

Figure 5B:
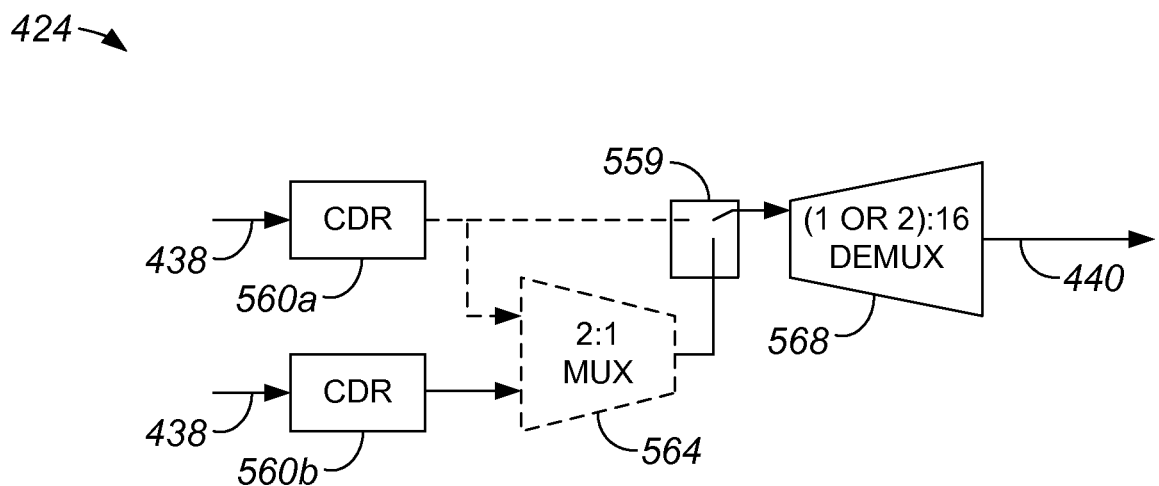
FIG. 5B is a diagrammatic representation of a clock data recovery (CDR) and demultiplexer arrangement, e.g., CDR and demultiplexer arrangement 424 of FIGS. 4A and 4B, in accordance with an embodiment of the present invention.

Referring next to FIG. 5B, one embodiment of a DQPSK/DPSK CDR and DEMUX, e.g., DQPSK/DPSK CDR and DEMUX 424 of FIGS. 4A-C, will be described. DQPSK/DPSK CDR and DEMUX 424 includes clock and data recovery (CDR) components 560a, 560b provide input to a MUX 564 and, via a switch 559, to a DEMUX 568. MUX 564 allows DQPSK/DPSK CDR and DEMUX 424 to process both DQPSK and DPSK transmission formats When signal 438 is associated with an approximately 40 G signal, DEMUX 568 is arranged to operate as a 2:16 DEMUX, whereas when signal 436 is associated with an approximately 20 G signal, DEMUX 568 is arranged to operate as a 1:16 DEMUX. In other words, DEMUX 568 is effectively a variable switch that outputs overall signal 440.

Figure 6:
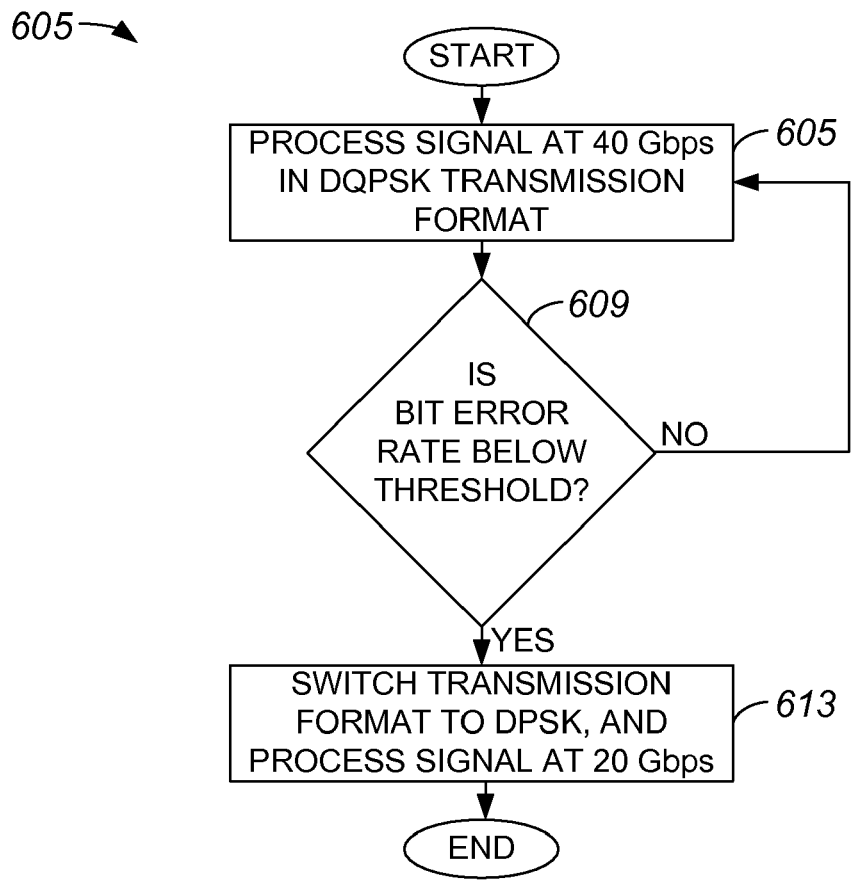
FIG. 6 is a process flow diagram which illustrates a method in which a bit error rate threshold is used to determine whether a transmission format is to be switched in accordance with an embodiment of the present invention.

The determination of whether a signal transmitted in a DQPSK transmission format at approximately 40 Gbps is to be transmitted in a DPSK transmission format at approximately 20 Gbps has been described as being based on an OSNR. It should be appreciated, however, that such a determination may be based on other factors. For example, a discovery that a BER associated with a signal is too low may be used to determine whether to modulate a transmission format. With reference to FIG. 6, one method of switching transmission formats which analyzes the BER associated with a signal will be described in accordance with an embodiment of the present invention. A method 601 of processing a signal begins at step 605 in which a signal is processed at approximately 40 Gbps in a DQPSK transmission format. Once the signal is processed, a determination is made in step 609 as to whether the BER associated with the signal is acceptable. The BER associated with the signal may be determined by any suitable method. A determination of whether the BER associated with the signal is acceptable may include determining of the BER is below a particular threshold, e.g., if a pre-FEC BER is below approximately 1E-4.

If it is determined in step 609 that the BER associated with the signal is not below the threshold, process flow returns to step 605 in which the signal is processed at approximately 40 Gbps in the DQPSK transmission format. Alternatively, if the determination in step 609 is that the BER associated with the signal is not below the threshold, then the transmission format is switched or otherwise transformed from a DQPSK transmission format to a DPSK transmission format, and the signal is processed at approximately 20 Gbps in step 613. After the approximately 20 Gbps signal is processed, the method of processing a signal is completed.

Figure 7:
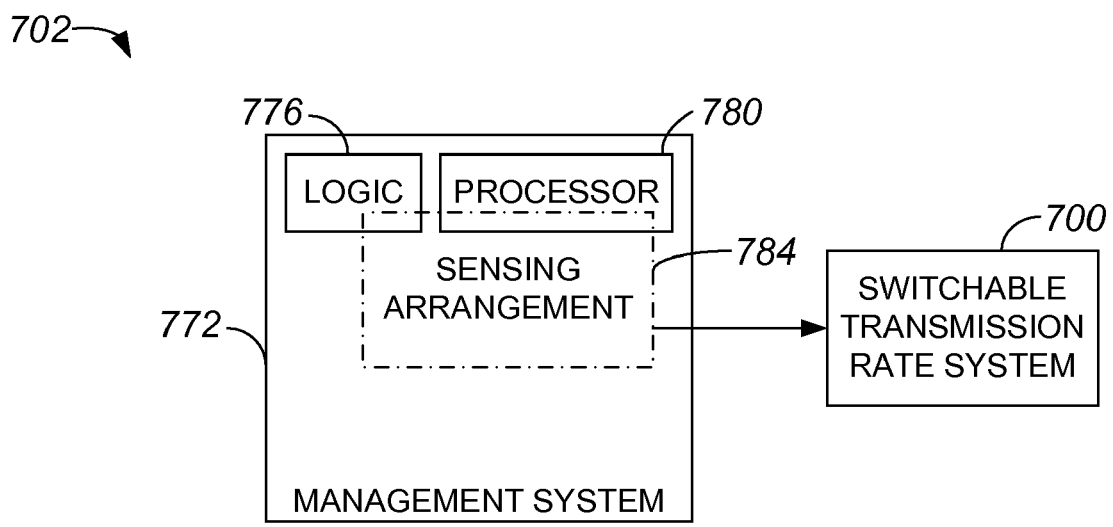
FIG. 7 is a block diagram representation of a first management system which monitors a switchable transmission rate system to determine whether a transmission format is to be changed in accordance with an embodiment of the present invention.

In general, a sensing arrangement may be used to monitor a system which supports switchable transmission rates to ascertain whether a transmission rate is to be modulated. Such a sensing arrangement may substantially automatically trigger the modulation of the transmission rate, or may notify an operator that a manual switching of transmission rates is in order. In one embodiment, a management system that is generally a part of a DWDM system or network may include logic that implements a sensing arrangement. FIG. 7 is a block diagram representation of a first management system which monitors a switchable transmission rate system to determine whether a transmission format is to be changed in accordance with an embodiment of the present invention. A DWDM system or network 702 includes a management system 772 and a system 700 which allows transmission rates to be switched or modulated. Management system 772 includes hardware and/or software logic 776, as well as a processor 780 which may execute software logic 776.

A sensing arrangement 784 monitors system 700 to determine when it is appropriate to switch or to modulate a transmission rate and format. In one embodiment, sensing arrangement 784 causes system 700 to substantially automatically switch a transmission rate. Sensing arrangement 784 may be an application that monitors, for example, the OSNR associated with system 700, or the BER associated with signals transmitted in system 700.

Figure 8:
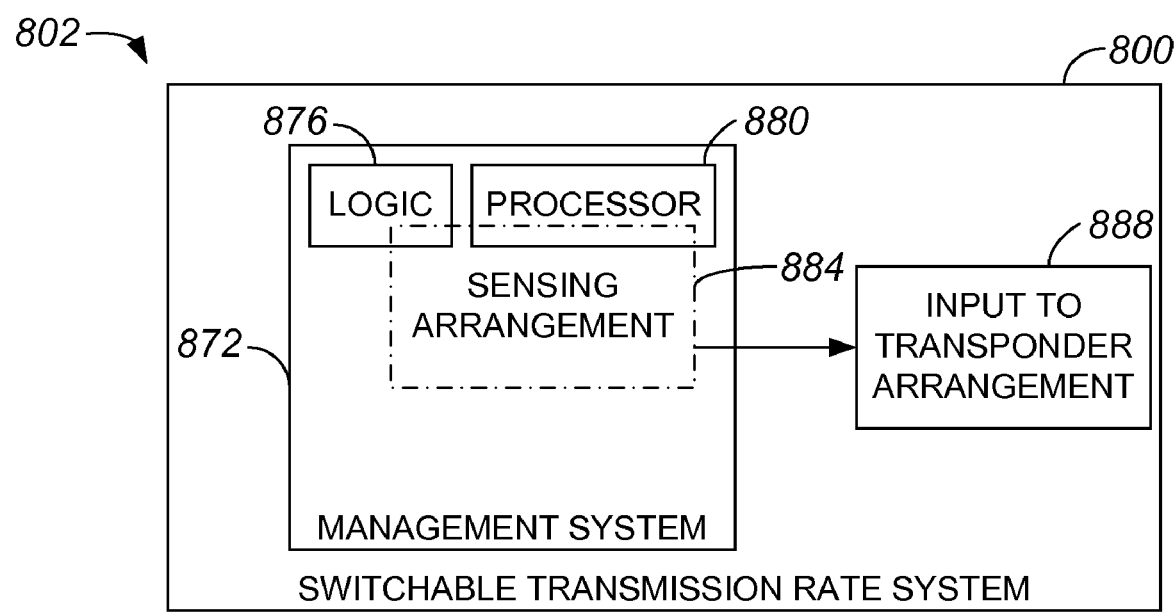
FIG. 8 is a block diagram representation of a second management system which monitors an input to a transponder arrangement of a switchable transmission rate system to determine whether a transmission format is to be changed in accordance with an embodiment of the present invention.

A management system may be located within a system that supports switchable transmission rates. That is, in lieu of being within a DWDM system but not within a subsystem that supports switchable transmission rates, a management system may be located within the subsystem. FIG. 8 is a block diagram representation of a second management system which monitors an input to a transponder arrangement of a switchable transmission rate system to determine whether a transmission format is to be changed in accordance with an embodiment of the present invention. A system 800 within a DWDM system or network 802 includes a management system 872 which includes a sensing arrangement 884. Sensing arrangement 884 may be embodied as logic 876 that is arranged to be executed by processor 880.

Sensing arrangement 884 monitors an input 888 to a transponder arrangement (not shown). Monitoring input 888 may enable sensing arrangement 884 to ascertain whether the OSNR associated with system 800 is adequate. Alternatively, sensing arrangement 884 may monitor input 888 to determine whether a BER associated with input 888 is below a particular threshold. Sensing arrangement 884 may, in one embodiment, also trigger the modulation of a transmission rate and a transmission format.

Although only a few embodiments of the present invention have been described, it should be understood that the present invention may be embodied in many other specific forms without departing from the spirit or the scope of the present invention. By way of example, the transmission rates that may be processed by a transponder are not limited to an approximately 40 Gbps transmission rate and an approximately 20 Gbps transmission rate. A transponder may support substantially any high speed transmission rates, such as transmission rates over approximately 10 Gbps.

Further, a transponder may be configured to process a variety of different transmission rates. In other words, the processing of transmission rates is not limited to processing a 40 Gbps transmission rate and a 20 Gbps transmission rate. For instance, a 10 Gbps transmission rate may be processed in lieu of, or in addition to, a 40 Gbps transmission rate and a 20 Gbps transmission rate.

Demultiplexers and multiplexers have been described as being utilized in a transponder to enable transmission rate and format changes to be performed. It should be appreciated, however, that substantially any suitable switch may be implemented in a transponder in lieu of demultiplexers and multiplexers.

The present invention is not limited to being implemented in a transponder. That is, the capability to modulate transmission rates is not limited to being implemented for use with a transponder arrangement that is part of a DWDM system or network. Such capability may be implemented in a router, and may be suitable in an internet protocol (IP) over wavelength division multiplexing (WDM) system.

While both a transmission rate and a transmission format have been described as being modulated, it should be appreciated that a transmission rate may be employed without changing the transmission format, and vice versa. By way of example, a signal of a first transmission rate and a first transmission format may be modulated into a signal of a second transmission rate and the second transmission format. Further, substantially any suitable signal of a DQPSK transmission format may be modulated into a signal of a DPSK transmission format.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. a method of processing signals in a dense wavelength division multiplexing (DWDM) system, the method comprising: obtaining a first signal; determining a transmission rate associated with the first signal, wherein determining the transmission rate associated with the first signal includes determining if an optical signal-to-noise-ratio (OSNR) associated with the first signal is sufficient for a particular level of performance; processing the first signal as having a first transmission format and a first rate if it is determined that the transmission rate associated with the first signal is the first rate; and processing the first signal as having a second transmission format and a second rate if it is determined that the transmission rate associated with the first signal is the second rate.

2. The method of claim 1 wherein the first rate is approximately 40 Gigabits per second (Gbps) and the second rate is approximately 20 Gbps.

3. The method of claim 1 wherein the first transmission format is a differential quadrature phase-shift keying (DQPSK) format and the second transmission format is a differential phase-shift keying (DPSK) format.

4. The method of claim 3 wherein the first rate is approximately 40 Gigabits per second (Gbps) and the second rate is less than approximately 40 Gbps, and wherein determining the transmission rate associated with the first signal includes attempting to process the first signal as having the first transmission format and the first rate.

5. The method of claim 4 wherein determining the transmission rate associated with the first signal further includes determining if attempting to process the first signal as having the first transmission format and the first rate is successful, wherein if attempting to process the first signal as having the first transmission format and the first rate is successful, the transmission rate associated with the first signal is determined to be the first rate.

6. The method of claim 5 wherein if attempting to process the first signal as having the first transmission format and the first rate is not successful, the transmission rate associated with the first signal is determined to be the second rate.

7. The method of claim 1 further including sending the first signal.

8. The method of claim 1 wherein determining the transmission rate associated with the first signal includes determining if a bit error rate (BER) associated with the first signal is below a threshold value.

9. The method of claim 1 wherein processing the first signal as having the second transmission format and the second rate includes switching from processing the first signal as having the first transmission format and the first rate.

10. a non-transitory tangible media encoded with computer-readable logic containing instructions for execution and when executed operable to: obtain a first signal; determine a transmission rate associated with the first signal, wherein the logic operable to determine the transmission rate associated with the first signal is further operable to determine if an optical signal-to-noise-ratio associated with the first signal is sufficient for a particular level of performance; process the first signal as having a first transmission format and a first rate if it is determined that the transmission rate associated with the first signal is the first rate; and process the first signal as having a second transmission format and a second rate if it is determined that the transmission rate associated with the first signal is the second rate.

11. The computer-readable logic of claim 10 wherein the first rate is approximately 40 Gigabits per second (Gbps) and the second rate is approximately 20 Gbps.

12. The computer-readable logic of claim 10 wherein the first transmission format is a differential quadrature phase-shift keying (DQPSK) format and the second transmission format is a differential phase-shift keying (DPSK) format.

13. The computer-readable logic of claim 10 further operable to send the first signal.

14. The computer-readable logic of claim 10 further operable to determine the transmission rate associated with the first signal rate by determining if a bit error rate (BER) associated with the first signal is below a threshold value.

15. The computer-readable logic of claim 14 wherein the logic operable to determine the bit error rate is further operable to determine whether an optical signal-to-noise ratio (OSNR) of the first signal is acceptable.

16. an apparatus comprising: a first circuit, the first circuit being capable of obtaining a first signal, the first signal having a first transmission rate, the first circuit further being capable of obtaining a second signal, the second signal having a second transmission rate; a second circuit, the second circuit being capable of processing the first signal, wherein processing the first signal includes processing the first signal using a first transmission format, the second circuit further being capable of processing the second signal, wherein processing the second signal includes processing the second signal using a second transmission format; and a third circuit, the third circuit including clock data recovery functionality, a multiplexer, and a demultiplexer.

17. the apparatus of claim 16 wherein the second circuit includes a precoder.

18. The apparatus of claim 16 wherein the first transmission format is a differential quadrature phase-shift keying (DQPSK) transmission format and the second transmission format is a differential phase-shift keying (DPSK) transmission format.

19. The apparatus of claim 18 wherein the first transmission rate is approximately 40 Gigabits per second (Gbps) and the second transmission rate is approximately 20 Gbps.

20. The apparatus of claim 16 further including a first forward error correction (FEC) framer to add error correction bits to the first signal.

21. the apparatus of claim 16 further including a fourth circuit, the fourth circuit being capable of determining whether the first signal or the second signal is to be obtained using at least one selected from the group including an optical signal-to-noise ratio (OSNR) associated with the apparatus and a bit error rate (BER) threshold associated with the apparatus.

22. The apparatus of claim 16 wherein the second circuit includes an interface to an optics arrangement.

23. an apparatus comprising: means for obtaining a first signal; means for determining a transmission rate associated with the first signal, wherein the means for determining the transmission rate associated with the first signal include means for determining if an optical signal-to-noise ratio (OSNR) associated with the first signal is sufficient for a particular level of performance; means for processing the first signal as having a first transmission format and a first rate if it is determined that the transmission rate associated with the first signal is the first rate; and means for processing the first signal as having a second transmission format and a second rate if it is determined that the transmission rate associated with the first signal is the second rate.

* * * * *